(12) United States Patent
Little et al.

(10) Patent No.: US 8,224,139 B2
(45) Date of Patent: Jul. 17, 2012

(54) TUNABLE OPTICAL FILTER

(75) Inventors: Brent E. Little, Glen Head, NY (US);
Wei Chen, Ellicott City, MD (US)

(73) Assignee: Infinera Corporation, Sunnyvale, CA (US)

( * ) Notice: Subject to any disclaimer, the term of this patent is extended or adjusted under 35 U.S.C. 154(b) by 482 days.

(21) Appl. No.: 12/195,699

(22) Filed: Aug. 21, 2008

(65) Prior Publication Data

US 2010/0046065 A1    Feb. 25, 2010

(51) Int. Cl.
*G02B 6/42* (2006.01)
*H04B 10/12* (2006.01)
(52) U.S. Cl. .............. 385/45; 359/337.1; 359/337.11
(58) Field of Classification Search ........ 359/337.1, 359/337.11; 385/45
See application file for complete search history.

(56) References Cited

U.S. PATENT DOCUMENTS

| | | | |
|---|---|---|---|
| 5,044,715 A * | 9/1991 | Kawachi et al. | 385/42 |
| 5,117,470 A * | 5/1992 | Inoue et al. | 385/14 |
| 5,572,611 A * | 11/1996 | Jinguji et al. | 385/17 |
| 6,633,698 B2 | 10/2003 | Hatayama et al. | |
| 6,697,544 B2 | 2/2004 | Pafchek et al. | |
| 6,724,957 B2 * | 4/2004 | Saida et al. | 385/27 |
| 6,952,309 B1 | 10/2005 | Tsuzaki et al. | |
| 7,085,438 B2 * | 8/2006 | Mizuno et al. | 385/3 |
| 2002/0021856 A1 * | 2/2002 | Hatayama et al. | 385/15 |
| 2002/0164124 A1 * | 11/2002 | Hatayama et al. | 385/39 |
| 2003/0031406 A1 * | 2/2003 | Saida et al. | 385/27 |
| 2003/0072534 A1 * | 4/2003 | Bona et al. | 385/40 |
| 2005/0149593 A1 * | 7/2005 | Koster et al. | 708/300 |
| 2006/0072866 A1 * | 4/2006 | Mizuno et al. | 385/1 |

OTHER PUBLICATIONS

Suzuki et al., "PLC-based dynamic gain equalizer consisting of integrated Mach-Zehnder interferometers with C- and L-band equalizing range", Electronics Letters, vol. 38, No. 18, pp. 1030-1031 (Aug. 29, 2002).*
Kyo Inoue et al., "Tunable Gain Equalization Using a Mach-Zehnder Optical Filter in Multi-Stage Fiber Amplifiers", IEEE Photonics Technology Letters, vol. 3, No. 8, Aug. 1991, pp. 718-720.

* cited by examiner

*Primary Examiner* — Eric Bolda
(74) *Attorney, Agent, or Firm* — David L. Soltz

(57) ABSTRACT

Consistent with the present disclosure a compact, integrated tunable filter is provided that can adjust the power levels of optical signals output from an optical amplifier, for example, so that the amplifier has a uniform spectral gain. The tunable optical filter includes a planar lightwave circuit (PLC) having cascaded Mach-Zehnder interferometers, each of which having corresponding differential optical delays. At least one of the differential optical delays is different than the rest. Alternatively, the differential optical delays are different from one another. Each of the Mach-Zehnder interferometers is connected to one another by a tunable optical coupler. Such a filter has an improved frequency response in that the number of shapes that the transmission spectrum may have is increased. Accordingly, the optical filter may be more finely tuned to more effectively flatten, for example, the output of the optical amplifier. In addition, since the tunable optical filter is realized with a planar lightwave circuit (PLC) component, manufacturing costs can be reduced, and a more compact device can be obtained.

23 Claims, 7 Drawing Sheets

TUNABLE OPTICAL FILTER

BACKGROUND

Wavelength division multiplexing (WDM) systems have been deployed to increase the capacity of existing fiber optic networks. In a WDM system, plural optical signal channels are carried over a single optical fiber with each channel being assigned a particular wavelength. Such systems typically include a plurality of receivers, each detecting a respective channel by effectively filtering out the remaining channels.

Optical channels in a WDM system are frequently transmitted over silica based optical fibers, which typically have relatively low loss at wavelengths within a range of 1525 nm to 1580 nm. WDM optical signal channels at wavelengths within this low loss "window" can be transmitted over distances of approximately 50 km without significant attenuation. For distances beyond 50 km, however, optical amplifiers are required to compensate for optical fiber loss.

Optical amplifiers have been developed which include an optical fiber doped with erbium. The erbium-doped fiber is "pumped" with light at a selected wavelength, e.g., 980 nm, to provide amplification or gain at wavelengths within the low loss window of the optical fiber. However, erbium doped fiber amplifiers do not uniformly amplify light within the spectral region of 1525 to 1580 nm. For example, an optical channel at a wavelength of 1540 nm, for example, is typically amplified 4 dB more than an optical channel at a wavelength of 1555 nm. While such a large variation in gain can be tolerated for a system with only one optical amplifier, it cannot be tolerated for a system with plural optical amplifiers or numerous, narrowly-spaced optical channels. In these environments, much of the pump power supplies energy for amplifying light at the high gain wavelengths rather than amplifying the low gain wavelengths. As a result, low gain wavelengths suffer excessive noise accumulation after propagating through several amplifiers.

Conventional gain flattened amplifiers have been developed, but such amplifiers typically include discrete components, which can be relatively expensive. Moreover, many optical amplifiers include components to flatten a particular gain spectrum. Such components, however, are not variable and thus may not be effective in flattening the gain spectrum of another amplifier. Thus, a unique component must be designed and manufactured for each amplifier.

Accordingly, there is a need for a tunable optical filter having a variable response or transmission characteristic which can be used to flatten multiple gain spectra. Such a filter may have other applications where a programmable filter spectral response is desired. Preferably, the tunable optical filter should have a compact design.

SUMMARY OF THE DISCLOSURE

Consistent with the present disclosure, an optical filter is provided which includes a substrate, and a first coupler provided on the substrate. A first heater is also provided on the substrate which is configured to adjust a temperature of the first coupler to thereby vary a coupling ratio of a portion of the first coupler. A first interferometer is also provided on the substrate, which has a first arm and a second arm. The first and second arms both have first and second ends, such that the first coupler is coupled to the first ends of the first and second arms of the first interferometer. A second coupler is also provided on the substrate and is coupled to the second ends of the first and second arms of the first interferometer. A second heater is further provided on the substrate and is configured to adjust a temperature of a portion of the second coupler to thereby vary a coupling ratio of the second coupler. A second interferometer is also provided on the substrate, and has a first arm and a second arm. Each of the first and second arms of the second interferometer have first and second ends, whereby the second coupler is coupled to the first ends of the first and second arms of the second interferometer. In addition, a third coupler is provided on the substrate and is coupled to the second ends of the first and second arms of the second interferometer. Further, a third heater is provided on the substrate and is configured to adjust a temperature of a portion of the third coupler to thereby vary a coupling ratio of the third coupler. A difference in length between the first and second arms of the first interferometer is different than a difference in length between the first and second arms of the second interferometer Consistent with an additional aspect of the present disclosure, an optical filter is provided that comprises a substrate and a plurality of stages provided on the substrate. Each of the plurality of stages includes a corresponding one of a plurality of couplers and a corresponding one of a plurality of waveguide pairs. Each of the plurality of waveguide is associated with a corresponding one of a plurality of differential lengths, wherein each of the plurality of differential lengths corresponds to a difference in length between a first waveguide in each of the plurality of waveguide pairs and a corresponding second waveguide in each of the plurality of waveguide pairs. A first one of the plurality of differential lengths is different than a second one of the plurality of differential lengths. A plurality of heaters is also provided on the substrate, each of which being associated with a corresponding one of the plurality of couplers. Each of the plurality of heaters is configured to adjust a temperature of a portion of each of the plurality of couplers, to thereby vary a coupling ratio of each of the plurality of couplers.

Further, consistent with the present disclosure, an optical amplifier is provided that includes an amplification stage including a fiber doped with a rare-earth element, and an optical filter coupled to an output of the amplification stage. The optical filter includes a substrate and a plurality of stages provided on the substrate. Each of the plurality of stages includes a corresponding one of a plurality of couplers and a corresponding one of a plurality of waveguide pairs. Each of the plurality of waveguide pairs extends is associated with a corresponding one of a plurality of differential lengths, wherein each of the plurality of differential lengths corresponds to a difference in length between a first waveguide in each of the plurality of waveguide pairs and a corresponding second waveguide in each of the plurality of waveguide pairs. A first one of the plurality of differential lengths is different than a second one of the plurality of differential lengths. A plurality of heaters is also provided on the substrate, each of which being associated with a corresponding one of the plurality of couplers. Each of the plurality of heaters is configured to adjust a temperature of a portion of each of the plurality of couplers, to thereby vary a coupling ratio of each of the plurality of couplers.

BRIEF DESCRIPTION OF THE DRAWINGS

Advantages of the present disclosure will be apparent from the following detailed description of the presently preferred embodiments thereof, which description should be considered in conjunction with the accompanying drawings in which.

DETAILED DESCRIPTION

Consistent with the present disclosure a compact, iintegrated tunable filter is provided that can adjust the power levels of optical signals output from an optical amplifier, for example, so that the amplifier has a uniform spectral gain. The tunable optical filter includes a planar lightwave circuit (PLC) having cascaded Mach-Zehnder interferometers, at least one of which having a different optical delay. Each of the Mach-Zehnder interferometers is connected to one another by a tunable optical coupler. Such a filter has an improved frequency response in that the number of shapes that the transmission spectrum may have is increased relative to conventional filters. Accordingly, the optical filter may be more finely tuned to more effectively flatten, for example, the output of the optical amplifier. In addition, since the tunable optical filter may be integrated onto a substrate, manufacturing costs can be reduced, and a more compact device can be obtained.

Reference will now be made in detail to the following exemplary embodiments of the disclosure which are illustrated in the accompanying drawings. Wherever possible, the same reference numbers will be used throughout the drawings to refer to the same or like parts.

Figure 1:
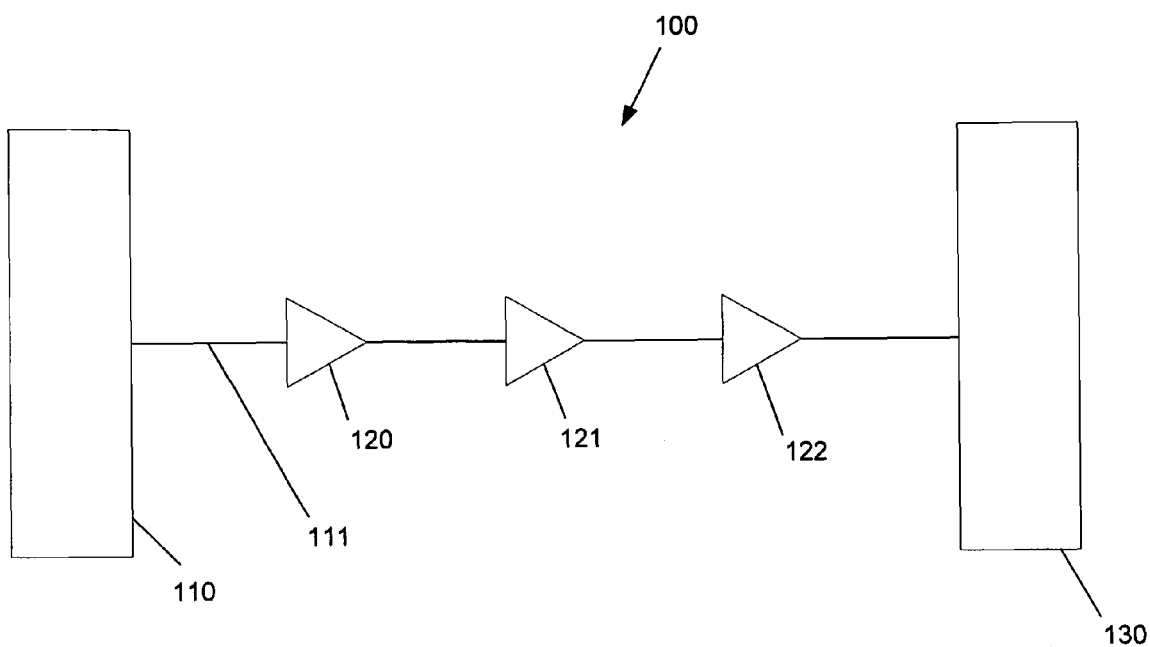
FIG. 1 is a block diagram of an optical communication system consistent with the present disclosure.

FIG. 1 illustrates WDM system 100 consistent with an aspect of the present disclosure. FIG. 1 includes terminal 110 that combines multiple optical signals or channels onto an optical communication path 111 including, for example, an optical fiber. The optical signals, typically within a relatively narrow band about 1550 nm, propagate along optical communication path 111 through optical amplifiers 120-122 and are supplied to terminal 130. Terminal 130 includes an optical demultiplexer (not shown) that separates the optical signals and supplies each one to a corresponding photodetector (not shown). The photodetector, in turn, generates corresponding electrical signals, which are subject to further processing.

Figure 2:
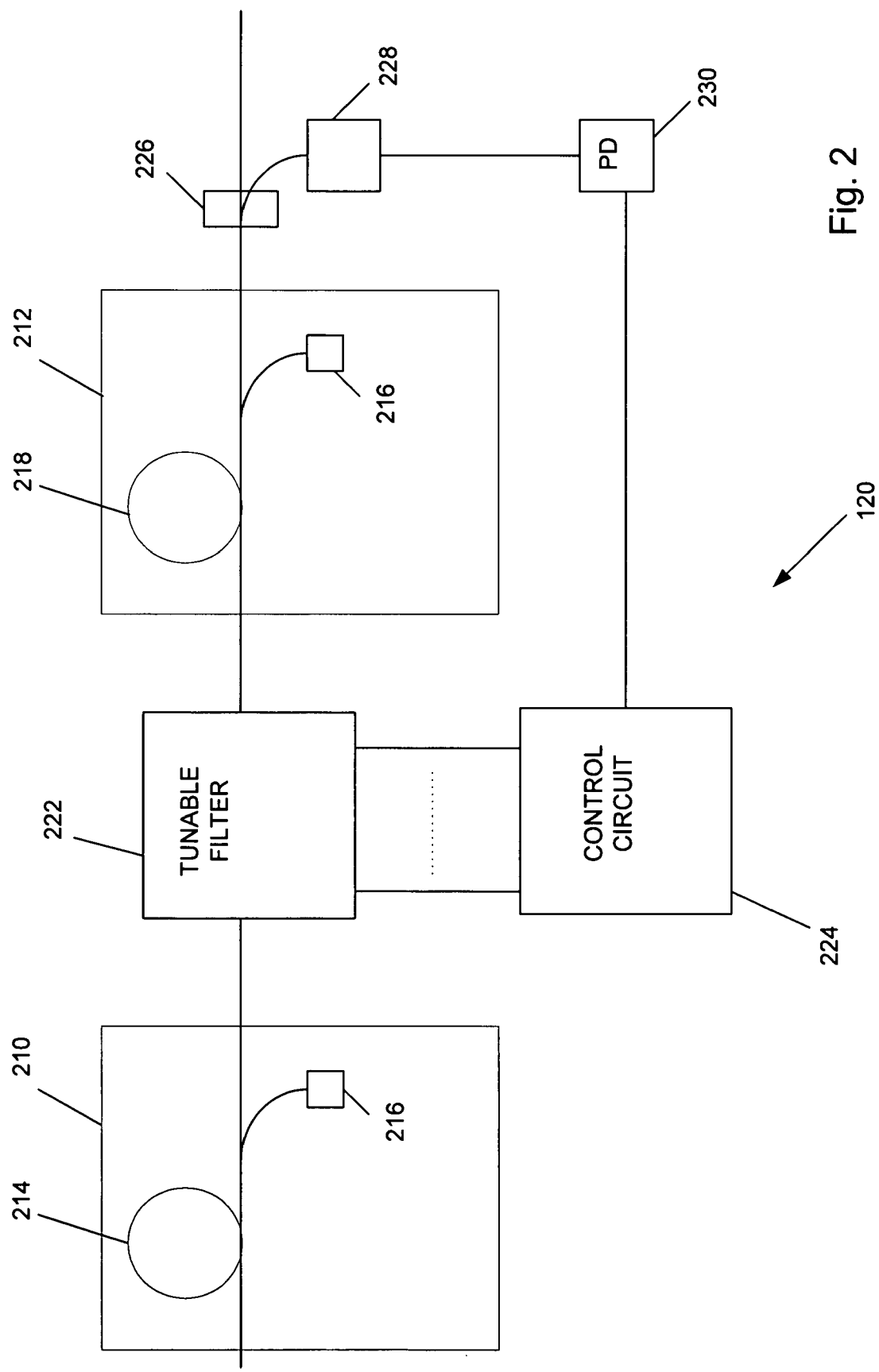
FIG. 2 is a block diagram of an optical amplifier consistent with the present disclosure.

FIG. 2 illustrates optical amplifier 120 in greater detail Optical amplifier 120 includes an amplification stage 210, which includes an optical fiber 214 doped with a fluorescent material, such erbium or another rare-earth element and a pump laser 216, which outputs pump light at a wavelength of 980 nm or 1480 nm, for example. The pump light energetically excites the atoms of the fluorescent material, and, when photons at one of the optical signal wavelengths are supplied to optical fiber 214, the excited atoms of fluorescent material can relax to a lower energy state, thereby releasing additional photons (and imparting optical gain) at the optical signal wavelength in a process known as stimulated emission.

The optical signals next pass through tunable filter 222, which is connected to an output of amplification stage 210, and are then fed to a known optical tap 226, which directs a portion of each of the optical signals (e.g., 1% to 10%) to variable filter 228, which, for example, may sequentially select each of the optical signals according to wavelength. Variable filter 228 may include, for example, a known ring resonator. Accordingly, for example, an optical signal portion having a first wavelength, e.g., 1550.1 nm, may be first output from filter 228 and then an optical signal portion having a second wavelength, e.g., 1550.2 nm is output from filter 228. The optical signal portions output from filter 228 are fed to photodetector 230, which, in turn supplies corresponding electrical signals to control circuit 224.

Control circuit 224 includes a known microprocessor, for example, or hardwired logic, configured to determine the power of each optical signal output from optical amplifier 120. To the extent these optical powers are to be adjusted so that they are substantially uniform, for example, control circuit 224 supplies control signals to tunable filter 222, to thereby appropriately adjust the transmission spectrum, thereof. Thus, for example, if a first optical signal at the first wavelength has too much power, the transmission spectrum or response of tunable fiber 222 is changed so that it has relatively low transmission at that wavelength, thereby attenuating that optical signal. On the other hand, the response of tunable filter 222 may also be adjusted to pass a second optical signal having relatively low power with much less attenuation, such that the second optical signal may maintain sufficient power when output from amplifier 120.

Although the optical signals are described as preferably having uniform power levels, it is understood that tunable filter 222 may be configured such that the optical signals have power levels conforming to any desired power spectrum, e.g., the power levels may have a tilt (i.e., increase or decrease in a linear fashion from the lowest wavelength optical signal to the optical signal having the highest wavelength). Moreover, it is understood that variable filter 228 may be replaced by an optical demultiplexer, such as an arrayed waveguide grating (AWG). In that case, each of the optical signal portions may be supplied to corresponding photodetectors, instead of a single photodetector, and the resulting electrical signals may be fed to control circuit 224 for adjusting tunable filter 222 accordingly.

Figure 3A:
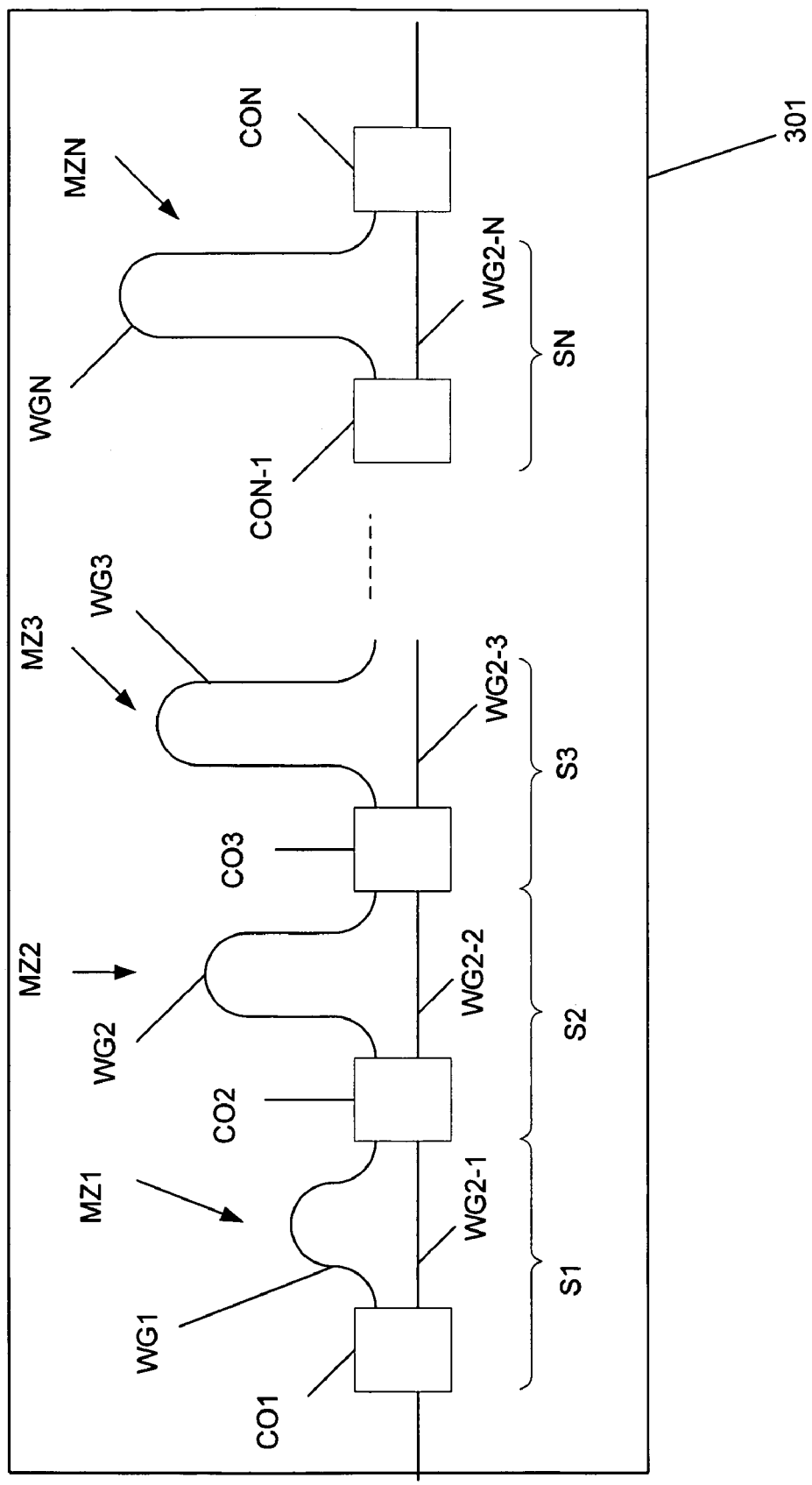
FIGS. 3a-3d show different examples of a tunable optical filter consistent with the present disclosure.

Tunable filter 222 will be described below with reference to FIGS. 3a-3d and 4. FIG. 3a is a generic block diagram of tunable filter 222 including a plurality of stages S1 to SN (N being an integer greater than 1) provided on substrate 301. Each of the plurality of stages includes a corresponding one of a plurality couplers CO1 to CON (having coupling ratios C1, where i is an integer from 1 to N) and a corresponding one of Mach-zehnder interferometers MZ1 to MZN. An additional coupler CON+1 is provided at the end of the cascade of stages S1 to SN. Each of Mach-Zehnder interferometers MZ1 to MZN includes a pair of waveguides, including a corresponding one of first waveguides WG1 to WGN, each of which extending between respective adjacent ones of couplers CO1 to CON+1, and a corresponding one of second waveguides WG2-1 to WG2-N. Each of stages S1 to SN is associated with a corresponding one of a plurality of differential lengths Li (where is an integer from 1 to N), wherein each differential length is a difference between a length of a first waveguide (e.g., one of waveguides WG1 to WGN) and a second waveguide (e.g., a corresponding one of waveguides WG2-1 to WG2-N). As further shown in FIG. 3a, first ends of each of first waveguides WG1 to WGN (as well as second waveguides WG2-1 to WG2-N) are coupled to one of couplers CO1 to CON+1 and a second end of each of these waveguides is coupled to an adjacent one of the couplers CO1 to CON+1. Accordingly, for example, a first end of waveguide WG1 is coupled to coupler CO1 and a second end is coupled to coupler CO2, while first and second ends of waveguide WG2-1 (see below) are also coupled to couplers CO1 and CO2, respectively.

At least one of the plurality of differential lengths Li is different from remaining ones of the plurality of differential lengths. Alternatively, as discussed in the examples below, each of the plurality of differential lengths Li is different from one another. Each differential length Li has an associated one of a plurality of differential delays Di (i.e., the time difference between the time required for an optical signal to propagate through one of first waveguides WG1 to WGN of a particular waveguide pair, and the time required for an optical signal to propagate through a corresponding second waveguide (one of waveguides WG2-1 to WG2-N)), such that each of the plurality of differential delay Di is associated with a corresponding one of the plurality of stages S1 to SN. Preferably, at a minimum, one of the differential delays should be different from remaining ones of the differential delays. In addition, each of second waveguides WG2-1 to WG2-N may have substantially the same length.

Tunable filter 222 may be realized as a PLC provided on a substrate. The PLC, including waveguides WG1 to WGN and WG2-1 to WG2-N, may comprise a material selected from a grouping consisting of silicon, silica, fused quartz, sapphire, glass, gallium-arsenide, silicon-carbide, indium-phosphide, silicon-on-insulator, germanium-on-insulator, silicon-germanium, silicon nitride, and silion oxynitride. In addition, each of waveguides WG1 to WGN and WG2-1 to WG2-N may include a suitable waveguide material, for example, SiOC, as disclosed in U.S. Pat. No. 7,043,133, the contents of which or incorporated by reference herein.

Ci and Di may represent a 2×2 matrix that describes the transfer function of each of tunable couplers CO1 to CON+1 and each differential delay Di, respectively. The transfer functions are in general frequency or wavelength dependent, and may also be polarization dependent. Tunable filter 222 may receive two complementary inputs, a and b, and supply two complementary outputs c and d. Tunable coupler 222 is reversible, in that c,d can be the inputs and a,b the outputs. In matrix notation, the outputs are related to the inputs by the filter transfer matrix S, as indicated in equation (1). The transfer matrix S is a sequential matrix multiplication of all the elements (in this case, coupling ratios Ci and delays Di), and is given by equation (2).

$$\begin{bmatrix} c \\ d \end{bmatrix} = S \begin{bmatrix} a \\ b \end{bmatrix} \qquad \text{Equation (1)}$$

$$S = (C_{N+1})(D_N C_N) \ldots (D_3 C_3)(D_2 C_2)(D_1 C_1) \qquad \text{Equation (2)}$$

The transmission spectrum or response of tunable filter 222 may be expressed as a Fourier Series, of the form shown in equation (3), in which: $R(\omega)$ is the response at one of the outputs (c and d in FIG. 3a), $\omega$ is the optical frequency, and $\Omega j$ are the periods associated with the differential delays Dj. The coefficients aj and bj of the series in equation (3) are adjustable by means of tuning the coupling ratios Ci of tunable couplers CO1 to CO1+N or phase position of the differential delays Di. M is a finite number and is associated with the number of delays in the filter (N) and the collection of periods ($\Omega j$). In general M is not equal to N unless all the delays are identical.

$$R(\omega) = \sum_{j=0}^{M} [a_j \cos(\Omega_j \omega) + b_j \sin(\Omega_j \omega)] \qquad \text{Equation (3)}$$

A target response $T(\omega)$ of tunable filter 222 can also be written as a Fourier series over a desired frequency range of interest $\omega 1$ to $\omega 2$, in the form of equation (4). Here, $\Lambda$ is the fundamental period of the response $T(\omega)$, and in this case the higher order periods are harmonics of the fundamental, such that $\Omega i = i\Lambda$.

$$T(\omega)|_{\omega_1}^{\omega_2} = \sum_{i=0}^{\infty} [A_i \cos(i\Lambda\omega) + B_i \sin(i\Lambda\omega)] \qquad \text{Equation (4)}$$

In general $T(\omega)$ is an infinite Fourier series, whose coefficients Ai and Bi eventually decrease for higher values of i. Preferably, $R(\omega)$ should be close to $T(\omega)$ over the frequency range of interest $\omega 1$ to $\omega 2$. Perfect matching between $R(\omega)$ and $T(\omega)$ may not be possible in many instances, however, since $T(\omega)$ has an infinite number of terms while the transmission spectrum or response realizable with tunable filter 222, $R(\omega)$, has a finite number of terms.

Assuming that tunable filter 222 has N=4 stages, and the differential lengths L1 to L4 are equal such that each Mach-Zehnder interferometer MZ1 to MZ4 has the same delay D, the response $R(\omega)$ may be defined as indicated in equation (5). Here, M=N=4, and there are four harmonic terms with the highest harmonic being four times the fundamental, ie 4 $\Lambda$. There is a complete harmonic set of terms up to 4 $\Lambda$, that is 0, $\Lambda$, 2 $\Lambda$, 3 $\Lambda$, 4 $\Lambda$. Equation (5) has 9 coefficients (a0 to a4, and b1 to b4), while tunable filter 222, in this instance, has nine free variables (or adjustable variables) associated with it, namely the five tunable coupler ratios C1 to C5 and the four phase constants of the differential delays D. Accordingly, each coefficient of equation 5 can be adjusted independently of the rest.

$$R(\omega) = \sum_{j=0}^{4} [a_j \cos(j\Lambda\omega) + b_j \sin(j\Lambda\omega)] \qquad \text{Equation (5)}$$

Figure 3B:
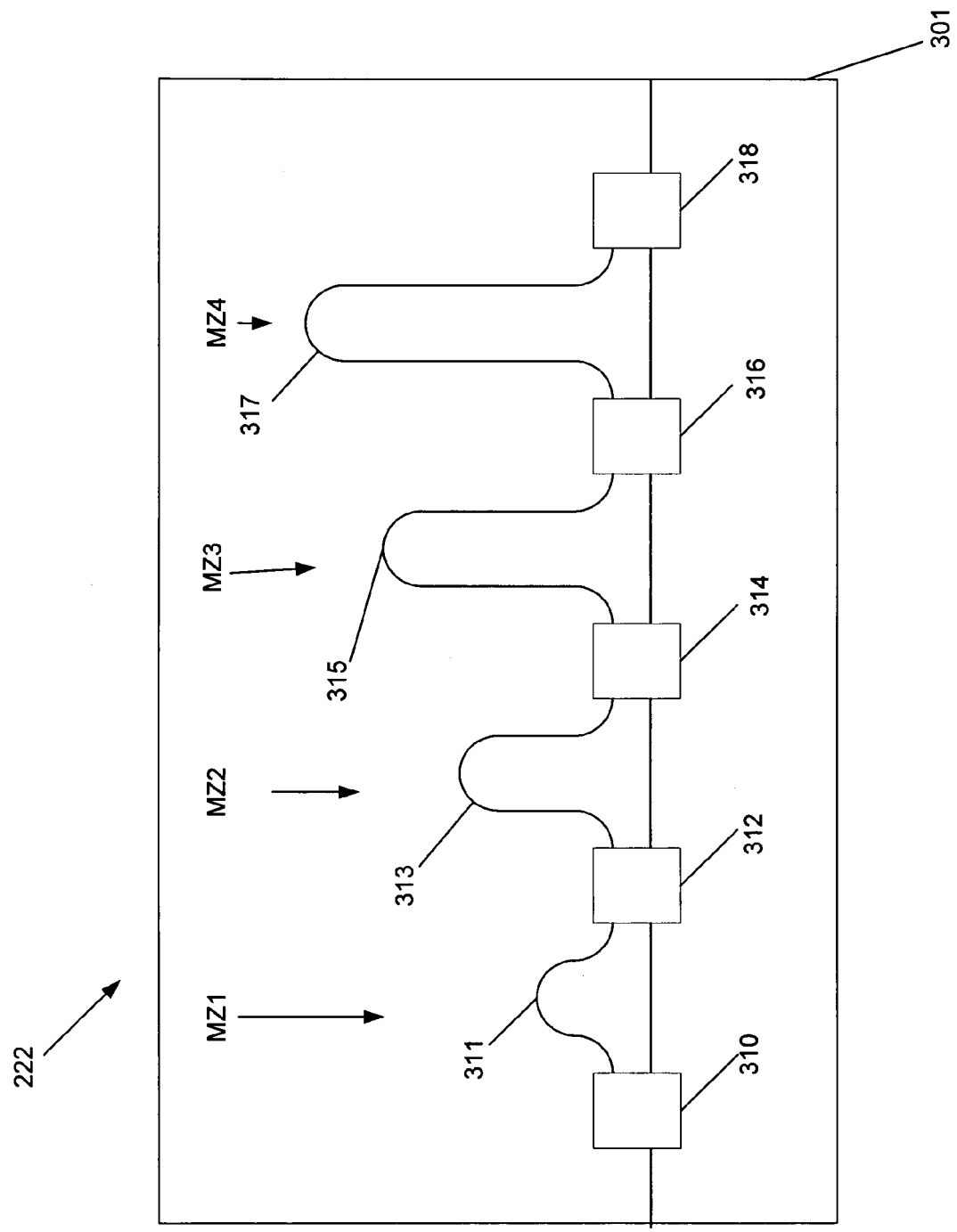

FIG. 3b illustrates an example, in which tunable filter 222 includes four stages, each including a respective one of Mach-Zehnder interferometers MZ1 to MZ4, as well as a corresponding one of tunable couplers 310, 312, 314, 316, and 318. Each of MZ1 to MZ4 includes a corresponding one of waveguides or arms 311, 313, 315, and 317, having an associated differential length. In this example, the differential length Li equals the differential length associated with the shortest arm 311, L, multiplied by i, such that the differential lengths may be characterized as being associated with harmonic delays. Accordingly, in FIG. 3b, the differential lengths are 2L, 3L, and 4L, and the response $R(\omega)$ of tunable filter 222 in this example is defined by equation (6).

$$R(\omega) = \sum_{j=0}^{10} [a_j \cos(j\Lambda\omega) + b_j \sin(j\Lambda\omega)] \qquad \text{Equation (6)}$$

Here, although N=4 (i.e. 4 stages), this case has M=10. That is, there are 10 harmonics forming a complete set up to 10 $\Lambda$. In this example, as in the example discussed above, nine free variables (or adjustable variables) are associated with tunable filter 222, namely the five tunable couplers and the four phase constants of the differential delays. However, equation (6) has 21 coefficients (a0 to a10, and b1 to b10). Accordingly, not all the coefficients are independently tunable. By adjusting the nine variables (couplers and phases), nine of the coefficients of equation (6) may be adjusted independently of one another, and the rest will be predetermined from their interdependence on those nine. Even though all the coefficients in equation (6) are not independent, there is "higher harmonic content" (more terms), than that of equation (5). Thus this example case can be viewed as being more general or flexible that that in which the differential delays are the same. That is, using harmonically related delays, a wider range of spectra or response shapes can be generated.

Figure 3C:
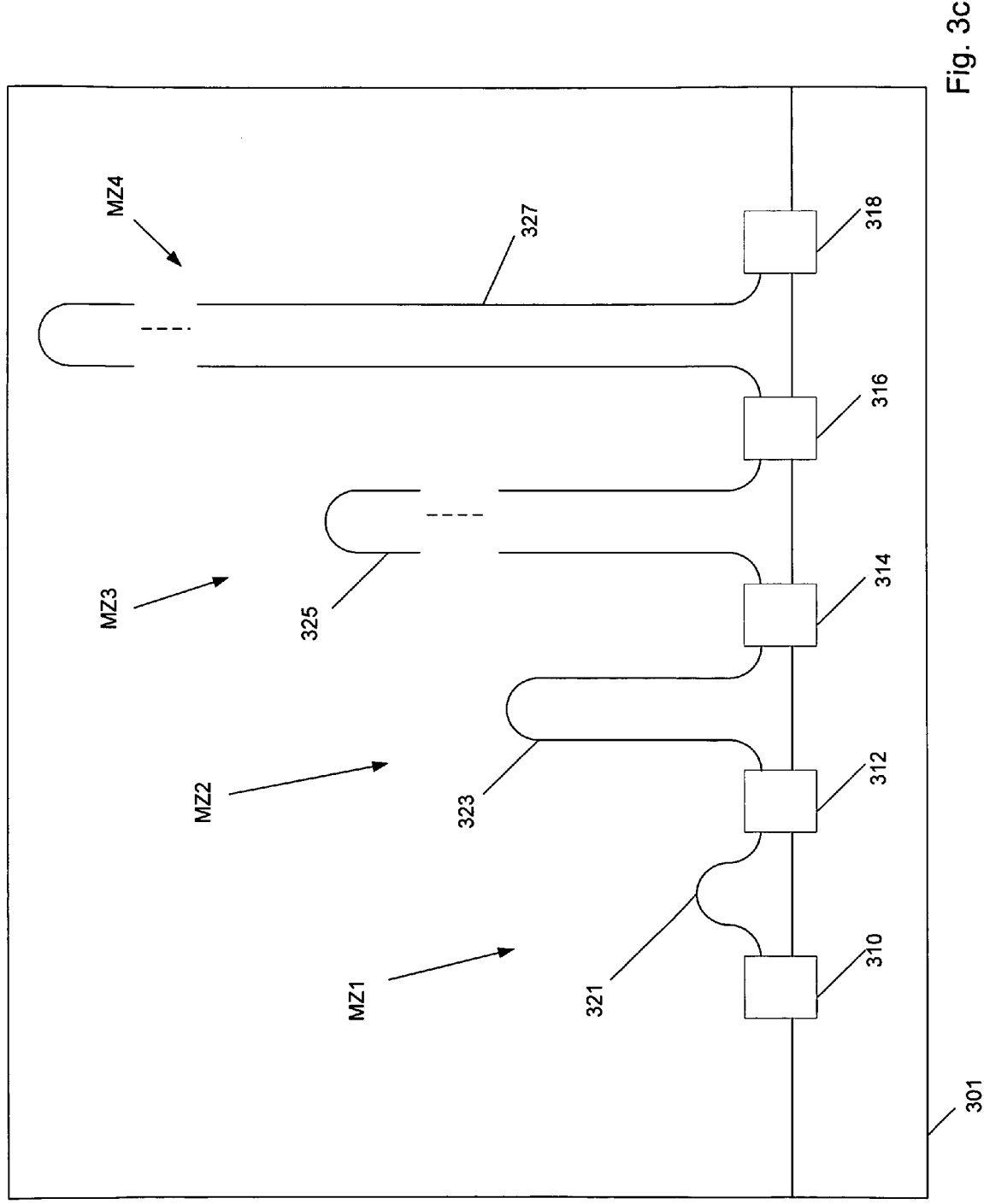

FIG. 3c illustrates an example in which the differential lengths associated with arms 321, 323, 325, and 327 of Mach-Zehnder interferometers MZ1, MZ2, MZ3, and MZ4, respectively, satisfy a geometric relationship, for example, Li=i²L. Here, if N=4 (i.e., four stages), the differential lengths are L, 4L, 9L, and 16L, where L is the differential length associated with the shortest arm 321, and the transmission function or response R(ω) of tunable filter 222 satisfies equation (7). In addition, $$R(\omega) = \sum_{j=0}^{30} [a_j \cos(j\Lambda\omega) + b_j \sin(j\Lambda\omega)] \quad \text{Equation (7)}$$

Here, M=30, such that there are 30 harmonics forming a complete set up to 30Λ. Although tunable filter 222 has nine variables associated with it (as in each of the above examples) equation (7) has 61 coefficients (a0 to a30, and b1 to b30). Thus, not all the coefficients are independently tunable. By adjusting the nine variables (couplers and phases) of tunable filter 222, nine of the coefficients of equation (7) can be adjusted independently, and the rest will be predetermined from their interdependence on those nine. Even though all the coefficients in equation (7) are not independent, there is "higher harmonic content" (more terms), than that of equations (5) or (6). Accordingly, this example can be viewed as being even more general or flexible that that of tunable filter 222 having uniform delay or harmonic delays, such that an even wider range of transmission spectrum shapes can be obtained.

Figure 3D:
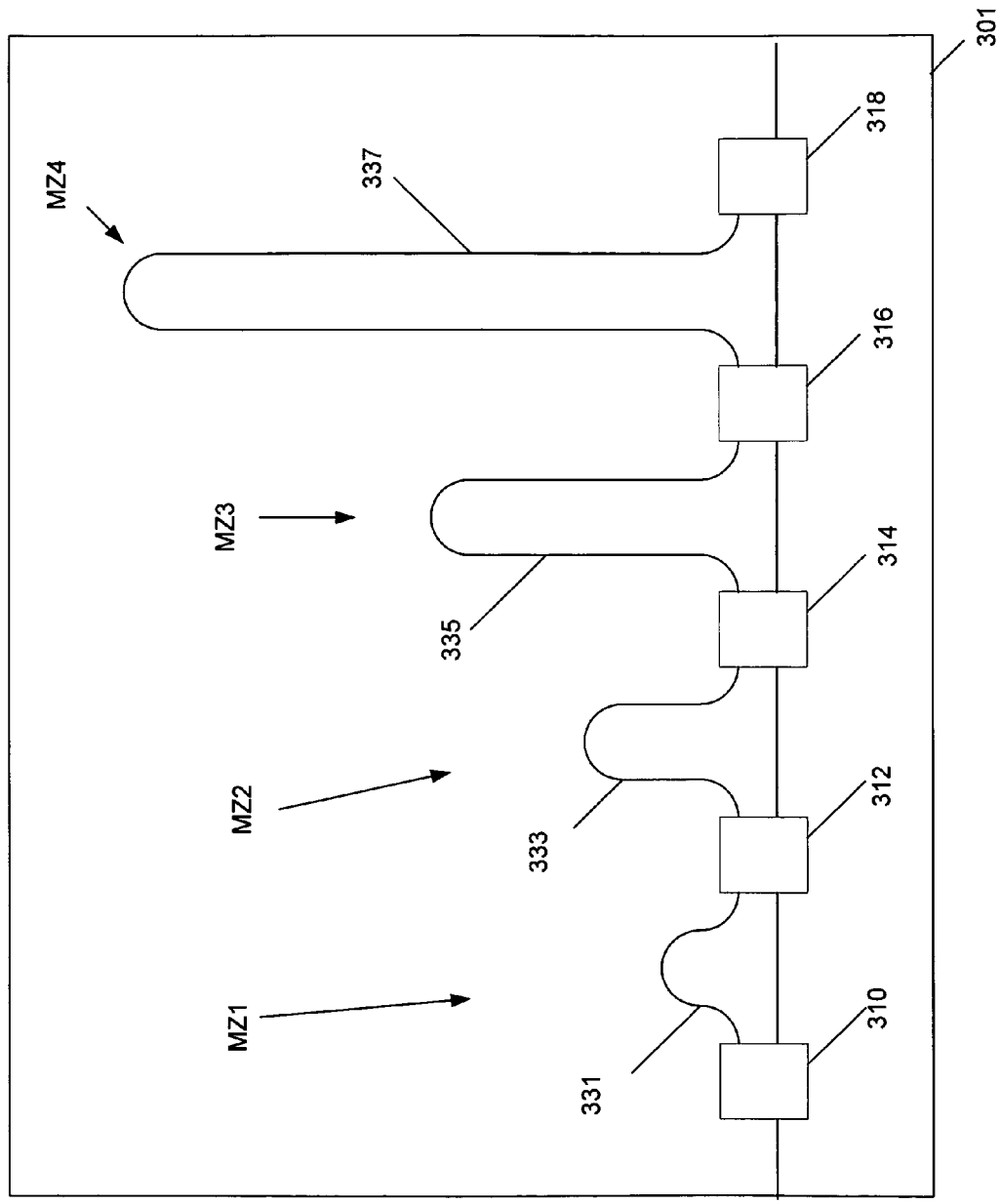

FIG. 3d illustrates another four-stage example in which the differential lengths associated with arms 331, 333, 335, and 337 of Mach-Zehnder interferometers MZ1 to MZ4 conform to an exponential function, such as Li=2$^{(i-1)}$L. Here, the differential lengths equal L, 2L, 4L, and 8L. Although N=4 (i.e. 4 stages), this case has M=15. That is, there are 30 harmonics forming a complete set up to 15 Λ. Again, tunable filter 222 has nine free variables (or adjustable variables), namely the 5 tunable couplers and the four phase constants of the differential delays. However, equation (8) below has 31 coefficients (a0 to a15, and b1 to b15). As a result, not all the coefficients are independently tunable. By adjusting the nine variables (couplers and phases) of tunable filter 222, nine of the coefficients of equation (8) can be varied independently of one another, and the rest will be predetermined from their interdependence on those nine.

$$R(\omega) = \sum_{j=0}^{15} [a_j \cos(j\Lambda\omega) + b_j \sin(j\Lambda\omega)] \quad \text{Equation (8)}$$

Even though all the coefficients in equation (8) are not independent, there is "higher harmonic content" (more terms), than that of equations (5) or (6). Accordingly, this example may be considered as being more general or flexible that that of tunable filter 222 having uniform delay or harmonic delays, such that a wider range of transmission spectrum shapes can be obtained and the filter may be more finely tuned.

For a 4-stage tunable filter, the exponentially related delays have fewer harmonic terms than the geometrically related delays (15 harmonics here compared to 30 harmonics in equation (7)). This is true for tunable filters that have from one to seven stages. Beyond seven stages, however, a tunable filter with exponentially related delays will have higher harmonic content.

Figure 4:
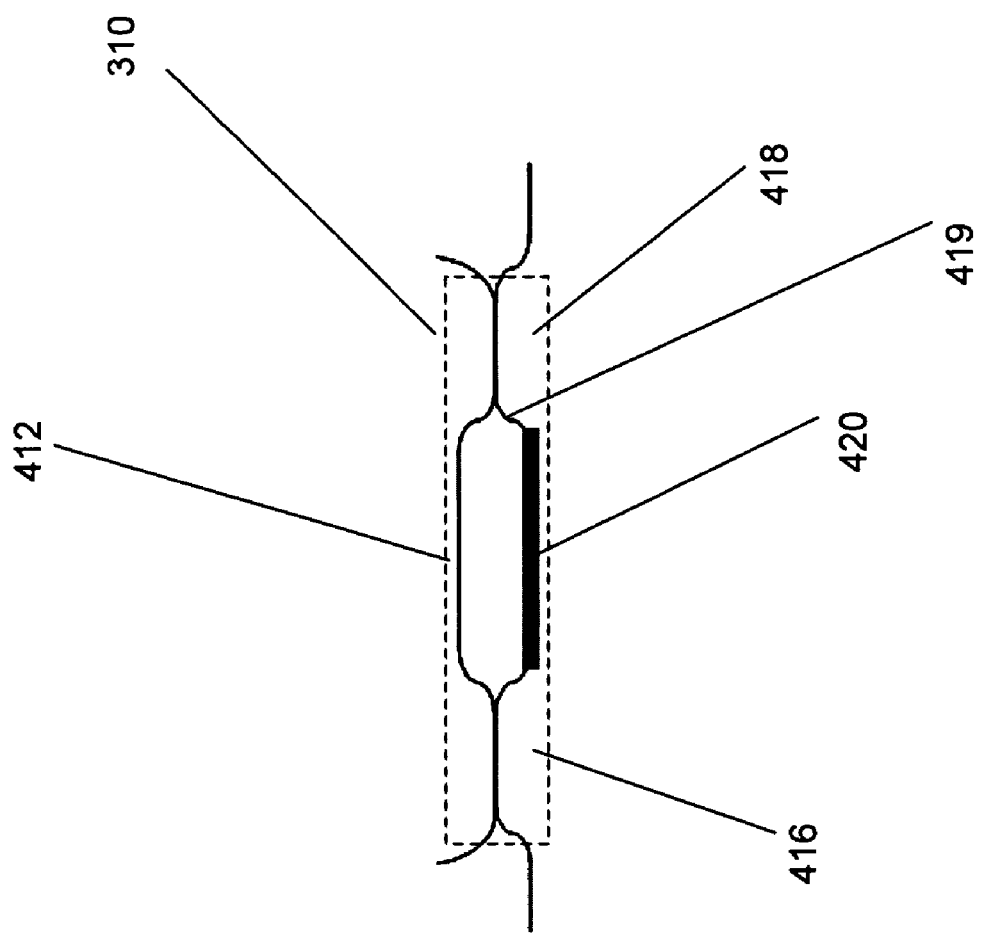
FIG. 4 illustrates a tunable coupler consistent with the present disclosure.

FIG. 4 illustrates an example of tunable coupler 310, consistent with an aspect of the present disclosure, it being understood that tunable couplers 312, 314, 316, and 318 have a similar structure as tunable coupler 310. Tunable coupler 310 may include a so-called "balanced" Mach-Zehnder interferometer including coupler portions 416 and 418 and two waveguides or arms 412 and 419 of substantially equal length extending therebetween. A known resistive heater 420 may be thermally coupled to one of the arms, e.g., arm 419 as shown in FIG. 4.

By changing the temperature of arm 419 with resistive heater 420, the refractive index of arm 419 changes, and, as a result, the optical path length of arm 419. Accordingly, the phase difference between light propagating in arms 412 and 419 in coupling section 418 also changes in accordance with the temperature of arm 419 so that the coupling ratio associated with tunable coupler 310 is also varied.

Heater 420 is controlled in accordance with electrical control signals output from control circuit 224 (see FIG. 2). Heaters present in remaining tunable couplers 310, 312, 314, 316, and 318 also receive electrical control signals from control circuit 224. The control signals have a particular voltage and current to adjust the temperatures of the heaters in tunable couplers 310, 312, 314, 316, and 318, so that each has a particular coupling ratio, to thereby control the tunable filter 222 so that it has a desired response.

Although a particular tunable coupler is shown in FIG. 4, it is understood that other tunable couplers may be employed in connection with the tunable filter discsussed above.

FIG. 5 illustrates tunable filter 222 consistent with an additional aspect of the present disclosure. In this example, additional heaters 511, 513, 515, and 517 are provided on substrate 301 in order to adjust the temperature of portions of arms 311, 313, 315, and 317, respectively. The heaters are preferably configured to receive additional control signals from control circuit 224 to provide further tenability of the filter 222. For example, heaters 511, 513, 515, and 517 may be provided to further adjust the optical path length of arms 311, 313, 315, and 317 in order offset minor changes in the length of these arms resulting from temperature changes or manufacturing non-idealities.

The tunable filter consistent with the present disclosure can generate a wide range of filter responses or transmission spectrum shapes. The shapes are tunable or reconfigurable by tuning the coupling ratio for each coupler and phase position of each delay. Since, consistent with the present disclosure, more transmission spectrum shapes can be generated the filter may be more finely tuned. By way of example, the 4-stage Fourier Filter having all identical differential delays has a response given by equation (5). The frequency content of this filter extends up to 4ωo (where ωo=2π/Λ). In this case, a pure sinusoidal response of the form cos(5ωo) cannot be produced since no spectral components up to 5ωo exist in this filter. On the other hand, each of the harmonic, geometric, and exponential 4-stage filter configurations discussed above (see FIGS. 3b, 3c, and 3d) have the frequency component 5ωo, and can thus synthesize this response.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical filter, comprising:
   a substrate;
   a first coupler provided on the substrate;
   a first heater provided on the substrate, the first heater configured to adjust a temperature of the first coupler to thereby vary a coupling ratio of a portion of the first coupler;
   a first interferometer provided on the substrate, the first interferometer having a first arm and a second arm, each of the first and second arms having first and second ends, the first coupler being coupled to the first ends of the first and second arms of the first interferometer;
   a second coupler provided on the substrate, the second coupler being coupled to the second ends of the first and second arms of the first interferometer;
   a second heater provided on the substrate, the second heater configured to adjust a temperature of a portion of the second coupler to thereby vary a coupling ratio of the second coupler;
   a second interferometer provided on the substrate, the second interferometer having a first arm and a second arm, each of the first and second arms of the second interferometer having first and second ends, the second coupler being coupled to the first ends of the first and second arms of the second interferometer;
   a third coupler provided on the substrate, the third coupler being coupled to the second ends of the first and second arms of the second interferometer;
   a third heater provided on the substrate and configured to adjust a temperature of a portion of the third coupler to thereby vary a coupling ratio of the third coupler; and
   a third interferometer provided on the substrate, the third interferometer having a first arm and a second arm, each of the first and second arms of the third interferometer having first and second ends, the first ends of the first and second arms of the third interferometer being coupled to the third coupler,
   wherein a difference in length between the first and second arms of the first interferometer is different than a difference in length between the first and second arms of the second interferometer, and
   the difference in length between the first and second arms of the first interferometer is L, the difference in length between the first and second arms of the second interferometer is 4L, and the difference in length between the first and second arms of the third interferometer is 9L.

2. An optical filter in accordance with claim 1, further comprising:
   a fourth coupler coupled to the second ends of the first and second arms of the third interferometer; and
   a fourth heater configured to adjust a temperature of a portion of the fourth coupler to thereby vary a coupling ratio of the fourth coupler,
   wherein a difference in length between the first and second arms of the third interferometer is different than the difference in length between the first and second arms of the first interferometer, and the difference in length between the first and second arms of the third interferometer is different than the difference in length between the first and second arms of the second interferometer.

3. An optical filter in accordance with claim 2, wherein the first and second arms of the first, second, and third interferometers include SiON.

4. An optical filter in accordance with claim 1, further comprising:
   a fourth heater configured to adjust a temperature of a portion of one of the first and second arms of the first interferometer; and
   a fifth heater configured to adjust a temperature of a portion of one of the first and second arms of the second interferometer.

5. An optical filter, comprising:
   a substrate;
   a plurality of stages provided on the substrate, each of the plurality of stages including a corresponding one of a plurality of couplers and a corresponding one of a plurality of waveguide pairs, each of the plurality of waveguide pairs being associated with a corresponding one of a plurality of differential lengths, wherein each of the plurality of differential lengths corresponds to a difference in length between a first waveguide in each of the plurality of waveguide pairs and a corresponding second waveguide in each of the plurality of waveguide pairs, a first one of the plurality of differential lengths being different than a second one of the plurality of differential lengths; and
   a plurality of heaters provided on the substrate, each of the plurality of heaters being associated with a corresponding one of the plurality of couplers, each of the plurality of heaters being configured to adjust a temperature of a portion of each of the plurality of couplers, to thereby vary a coupling ratio of each of the plurality of couplers,
   wherein a number of the plurality of stages is equal to N, each of the plurality of differential lengths ($L_i$) satisfies:

$$L_i = i^2 L,$$

where L is a shortest one of the plurality of differential lengths, i is an integer from 1 to N, and N is a number of the plurality of stages.

6. An optical filter in accordance with claim 5, wherein each of the plurality of waveguides includes SiON.

7. An optical filter in accordance with claim 6, wherein the plurality of heaters is a first plurality of heaters, the optical filter including a second plurality of heaters, each of which being configured to adjust a temperature of a portion of a corresponding one of the first waveguide of each of said plurality of waveguide pairs.

8. An optical amplifier, comprising:
   an amplification stage including a fiber doped with a rare-earth element, the amplification stage having an output;
   an optical filter coupled to the output of the amplification stage, the optical filter, including:
      a substrate;
      a plurality of stages provided on the substrate, each of the plurality of stages including a corresponding one of a plurality of couplers and a corresponding one of a plurality of waveguide pairs, each of the plurality of waveguide pairs being associated with a corresponding one of a plurality of differential lengths, wherein each of the plurality of differential lengths corresponds to a difference in length between a first waveguide in each of the plurality of waveguide pairs and a corresponding second waveguide in each of the plurality of waveguide pairs, a first one of the plurality of differential lengths being different than a second one of the plurality of differential lengths; and
      a plurality of heaters provided on the substrate, each of the plurality of heaters being associated with a corresponding one of the plurality of couplers, each of the plurality of heaters being configured to adjust a temperature of a portion of each of the plurality of couplers, to thereby vary a coupling ratio of each of the plurality of couplers;
an optical tap configured to receive an optical signal supplied from the second amplification stage;
a photodiode coupled to the optical tap and configured to receive a portion of the optical signal supplied from the second amplification stage, the photodiode generating an electrical output in response to the portion of the optical signal; and
a control circuit coupled to the photodiode, the control circuit being configured to generate a plurality of control signals in response to the electrical output, each of the plurality of control signals being fed to a corresponding one of the plurality of heaters.

9. An optical amplifier in accordance with claim 8, wherein a number of the plurality of stages is equal to N, each of the plurality of differential lengths (Li) satisfies:

$$L_i = iL$$

where L is a shortest one of the plurality of differential lengths, i is an integer from 1 to N, and N is a number of the plurality of stages.

10. An optical amplifier in accordance with claim 8, wherein a number of the plurality of stages is equal to N, each of the plurality of differential lengths (Li) satisfies:

$$L_i = i^2 L,$$

where L is a shortest one of the plurality of differential lengths, i is an integer from 1 to N, and N is a number of the plurality of stages.

11. An optical amplifier in accordance with claim 8, wherein a number of the plurality of stages is equal to N, each of the plurality of differential lengths (Li) satisfies:

$$L_i = 2^{(i-1)} L,$$

where L is a shortest one of the plurality of differential lengths, i is an integer from 1 to N, and N is a number of the plurality of stages.

12. An optical amplifier in accordance with claim 8, wherein each of the plurality of waveguides includes SiON.

13. An optical amplifier in accordance with claim 12, wherein the plurality of heaters is a first plurality of heaters, the optical filter including a second plurality of heaters, each of which being configured to adjust a temperature of a portion of a corresponding one of the first waveguide of each of said plurality of waveguide pairs.

14. An optical amplifier in accordance with claim 8, wherein each said first waveguide of each of the plurality of waveguide pairs has substantially the same length.

15. An optical amplifier in accordance with claim 8, wherein each of the plurality of couplers includes a corresponding one of a plurality of Mach-Zehnder interferometers, the portion of each of the plurality of couplers includes a corresponding part of each of the plurality of Mach-Zehnder interferometers.

16. An optical filter in accordance with claim 8, wherein each of the plurality of differential lengths is different from one another.

17. An optical filter, comprising:
a substrate;
a first coupler provided on the substrate;
a first heater provided on the substrate, the first heater configured to adjust a temperature of the first coupler to thereby vary a coupling ratio of a portion of the first coupler;
a first interferometer provided on the substrate, the first interferometer having a first arm and a second arm, each of the first and second arms having first and second ends, the first coupler being coupled to the first ends of the first and second arms of the first interferometer;
a second coupler provided on the substrate, the second coupler being coupled to the second ends of the first and second arms of the first interferometer;
a second heater provided on the substrate, the second heater configured to adjust a temperature of a portion of the second coupler to thereby vary a coupling ratio of the second coupler;
a second interferometer provided on the substrate, the second interferometer having a first arm and a second arm, each of the first and second arms of the second interferometer having first and second ends, the second coupler being coupled to the first ends of the first and second arms of the second interferometer;
a third coupler provided on the substrate, the third coupler being coupled to the second ends of the first and second arms of the second interferometer;
a third heater provided on the substrate and configured to adjust a temperature of a portion of the third coupler to thereby vary a coupling ratio of the third coupler; and
a third interferometer provided on the substrate, the third interferometer having a first arm and a second arm, each of the first and second arms of the third interferometer having first and second ends, the first ends of the first and second arms of the third interferometer being coupled to the third coupler,
wherein a difference in length between the first and second arms of the first interferometer is different than a difference in length between the first and second arms of the second interferometer,
wherein the difference in length between the first and second arms of the first interferometer is L, the difference in length between the first and second arms of the second interferometer is 2L, and the difference in length between the first and second arms of the third interferometer is 4L.

18. An optical filter in accordance with claim 17, further comprising:
a fourth coupler coupled to the second ends of the first and second arms of the third interferometer; and
a fourth heater configured to adjust a temperature of a portion of the fourth coupler to thereby vary a coupling ratio of the fourth coupler,
wherein a difference in length between the first and second arms of the third interferometer is different than the difference in length between the first and second arms of the first interferometer, and the difference in length between the first and second arms of the third interferometer is different than the difference in length between the first and second arms of the second interferometer.

19. An optical filter in accordance with claim 18, wherein the first and second arms of the first, second, and third interferometers include SiON.

20. An optical filter in accordance with claim 17, further comprising:
a fourth heater configured to adjust a temperature of a portion of one of the first and second arms of the first interferometer; and
a fifth heater configured to adjust a temperature of a portion of one of the first and second arms of the second interferometer.

21. An optical filter, comprising:
a substrate;
a plurality of stages provided on the substrate, each of the plurality of stages including a corresponding one of a plurality of couplers and a corresponding one of a plurality of waveguide pairs, each of the plurality of waveguide pairs being associated with a corresponding one of a plurality of differential lengths, wherein each of the plurality of differential lengths corresponds to a difference in length between a first waveguide in each of the plurality of waveguide pairs and a corresponding second waveguide in each of the plurality of waveguide pairs, a first one of the plurality of differential lengths being different than a second one of the plurality of differential lengths; and
a plurality of heaters provided on the substrate, each of the plurality of heaters being associated with a corresponding one of the plurality of couplers, each of the plurality of heaters being configured to adjust a temperature of a portion of each of the plurality of couplers, to thereby vary a coupling ratio of each of the plurality of couplers, wherein a number of the plurality of stages is equal to N, each of the plurality of differential lengths ($L_i$) satisfies:

$$L_i = 2^{(i-1)} L,$$

where L is a shortest one of the plurality of differential lengths, i is an integer from 1 to N, and N is a number of the plurality of stages.

22. An optical filter in accordance with claim 21, wherein each of the plurality of waveguides includes SiON.

23. An optical filter in accordance with claim 22, wherein the plurality of heaters is a first plurality of heaters, the optical filter including a second plurality of heaters, each of which being configured to adjust a temperature of a portion of a corresponding one of the first waveguide of each of said plurality of waveguide pairs.

* * * * *